United States Patent
Kato (10) Patent No.: US 10,860,913 B2
(45) Date of Patent: Dec. 8, 2020

(54) RFID TAG MANUFACTURING APPARATUS AND METHOD FOR MANUFACTURING RFID TAG

(71) Applicant: Murata Manufacturing Co., Ltd., Nagaokakyo (JP)

(72) Inventor: Noboru Kato, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 16/234,772

(22) Filed: Dec. 28, 2018

(65) Prior Publication Data

US 2019/0138871 A1 May 9, 2019

Related U.S. Application Data

(63) Continuation of application No. PCT/JP2017/024781, filed on Jul. 6, 2017.

(30) Foreign Application Priority Data

Jul. 15, 2016 (JP) .................... 2016-140296

(51) Int. Cl.
  *G06K 19/077* (2006.01)
(52) U.S. Cl.
  CPC . *G06K 19/07718* (2013.01); *G06K 19/07773* (2013.01)
(58) Field of Classification Search
  CPC .............................. G06K 19/07718
  (Continued)

(56) References Cited

U.S. PATENT DOCUMENTS 9,004,366 B2    4/2015  Smith et al.
9,775,270 B2    9/2017  Kato
(Continued)

FOREIGN PATENT DOCUMENTS

JP    H0912058 A      1/1997
JP    2006156483 A    6/2006
(Continued)

OTHER PUBLICATIONS

International Search Report issued in PCT/JP2017/024781, dated Sep. 19, 2017.
(Continued)

*Primary Examiner* — Toan C Ly
(74) *Attorney, Agent, or Firm* — Arent Fox LLP (57) ABSTRACT

An RFID tag manufacturing apparatus that includes an antenna base material conveying part that conveys an antenna base material with antenna patterns in a first direction. Moreover, the apparatus includes a conveying part for an RFIC element that supplies an RFIC element having terminal electrodes for connection with the antenna patterns on one principal surface. A plotter is further provided that conveys the supplied RFIC element to a predetermined position of the antenna patterns and temporarily bonds the RFIC element to the antenna patterns. Finally, the apparatus includes a pressurizing part that applies a pressure to the temporarily bonded RFIC element to permanently bond the RFIC element to the antenna patterns. In an aspect, the plotter includes a fixed arm portion and a movable suction head.

15 Claims, 11 Drawing Sheets

(58) Field of Classification Search
USPC .......................................................... 235/492
See application file for complete search history.

(56) References Cited

U.S. PATENT DOCUMENTS

| | | | |
|---|---|---|---|
| 2007/0183184 A1* | 8/2007 | Nakamura | .............. H01L 24/75 |
| | | | 365/149 |
| 2007/0296445 A1* | 12/2007 | Kim | .................. H01L 21/67144 |
| | | | 324/750.2 |
| 2009/0095818 A1 | 4/2009 | Smith et al. | |
| 2016/0353619 A1 | 12/2016 | Kato | |

FOREIGN PATENT DOCUMENTS

| | | | |
|---|---|---|---|
| JP | 2007080153 A | 3/2007 | |
| JP | 2007108983 A | 4/2007 | |
| JP | 2014160515 A | 9/2014 | |
| JP | 5904316 B1 | 4/2016 | |

OTHER PUBLICATIONS

Written Opinion of the International Searching Authority issued in PCT/JP2017/024781, dated Sep. 19, 2017.

\* cited by examiner

RFID TAG MANUFACTURING APPARATUS AND METHOD FOR MANUFACTURING RFID TAG

CROSS-REFERENCE TO RELATED APPLICATIONS

This application is a continuation of International Patent Application No. PCT/JP2017/024781 filed on Jul. 6, 2017, which claims priority to Japanese Patent Application No. 2016-140296, filed on Jul. 15, 2016, the contents of each of which are incorporated herein by reference.

TECHNICAL FIELD

The present disclosure relates to an RFID tag manufacturing apparatus and a method for manufacturing an RFID tag.

BACKGROUND

Various types of RFID tags exist. For example, in one existing configured of an RFID tag, an RFIC element is disposed between two antenna elements to form a dipole RFID tag. Steps known as a method for manufacturing an RFID tag include a roll-to-roll process, a pick-and-place process, etc. for affixing a strap-type RFIC element with an adhesive layer to a base film on which an antenna pattern is formed, as shown in Japanese Laid-Open Patent Publication No. 2014-160515.

In the roll-to-roll process, a base film having RFIC elements mounted thereon and a base film provided with antenna patterns are arranged to face and brought into contact with each other, so that the RFIC elements are directly affixed to the antenna patterns between the base films. In the pick-and-place process, RFICs arranged in a planar shape are picked up and disposed on antenna patterns arranged in a planar shape.

However, when RFID tags are manufactured only by the roll-to-roll process, it is difficult to maintain mounting accuracy of an RFIC element on a base film. Additionally, a tension is applied to each of the base films and tends to stretch each of them. Therefore, the roll-to-roll process has a problem that low accuracy of alignment between an RFIC element and an antenna pattern results in poor productivity. The RFID tags have a wide variety of antenna shapes, and therefore, various models must be produced in small quantities. In this manufacturing method, when the models are changed, it is necessary to replace all of the base films and roll-shaped members of the antenna patterns and adjust mounting positions, which results in poor productivity.

Moreover, when RFID tags are manufactured only by the pick-and-place process, a considerable time is required since permanent bonding is performed only by placement. Additionally, when only the pick-and-place process is used, a pick-and-place machine is made long from a fixed part to a head part and freely movable in the XYZ directions and therefore has a large movable range. Thus, it is necessary to maintain a structural strength of a head and an arm part of a mounting machine, so that members used therein are increased in weight. This leads to a longer time required for a tip portion of the head to completely stop due to an inertial force after moving the head and the arm at high speed, which causes problems of a slow mounting speed and a deterioration in mounting accuracy due to vibration of a mounting head. Therefore, an improvement in productivity and a reduction in cost of production facilities are problematically limited.

SUMMARY OF THE INVENTION

Thus, according to an exemplary embodiment, an RFID tag manufacturing apparatus and a method is provided for manufacturing an RFID tag improved in productivity.

In one exemplary aspect, an RFID tag manufacturing apparatus is disclosed that includes an antenna base material conveying part that conveys an antenna base material including a plurality of antenna patterns in a first direction; a conveying part for an RFIC element that supplies an RFIC element having terminal electrodes for connection with the antenna patterns on one principal surface; a plotter that conveys the supplied RFIC element to a predetermined position of the antenna patterns and temporarily bonding the RFIC element to the antenna patterns; and a pressurizing part that applies a pressure to the temporarily bonded RFIC element to permanently bond the RFIC element to the antenna patterns, wherein the plotter includes a fixed arm portion and a movable suction head.

In another exemplary aspect, a method for manufacturing an RFID tag is disclosed that includes conveying an antenna base material including a plurality of antenna patterns in a first direction; supplying an RFIC element having terminal electrodes for connection with the antenna patterns on one principal surface; conveying and temporarily bonding the supplied RFIC element to a predetermined position of the antenna patterns by the plotter including a fixed arm portion and a movable suction head; and permanently bonding the temporarily bonded RFIC element to the antenna patterns.

The RFID tag manufacturing apparatus and the method for manufacturing an RFID tag according to the exemplary embodiments provide improved productivity in manufacturing of RFID tags.

DETAILED DESCRIPTION

According to an exemplary aspect, an RFID tag manufacturing apparatus is disclosed that includes an antenna base material conveying part that conveys an antenna base material including a plurality of antenna patterns in a first direction; a conveying part for an RFIC element that supplies an RFIC element having terminal electrodes for connection with the antenna patterns on one principal surface; a plotter that conveys the supplied RFIC element to a predetermined position of the antenna patterns and temporarily bonding the RFIC element to the antenna patterns; and a pressurizing part that applies a pressure to the temporarily bonded RFIC element to permanently bond the RFIC element to the antenna patterns, wherein the plotter includes a fixed arm portion and a movable suction head.

The above configuration can provide improved productivity in manufacturing of RFID tags.

According to another exemplary aspect, the plotter is a uniaxial plotter that conveys the supplied RFIC element to a predetermined position of the antenna substrate in a second direction crossing the first direction.

According to yet another exemplary aspect, the plotter includes a plurality of uniaxial plotters extending in the second direction.

According to yet another exemplary aspect, the uniaxial plotter has a suction head that sucks and releases the RFIC element and conveys the RFIC element in the second direction.

According to yet another exemplary aspect, the suction head is disposed at the advancing side in the first direction relative to the center of the RFIC element to suck the RFIC element, and to convey the RFIC element toward the second direction.

According to an exemplary aspect, a method is disclosed for manufacturing an RFID tag that includes conveying an antenna base material including a plurality of antenna patterns in a first direction; supplying an RFIC element having terminal electrodes for connection with the antenna patterns on one principal surface; conveying and temporarily bonding the supplied RFIC element to a predetermined position of the antenna patterns by the plotter including a fixed arm portion and a movable suction head; and permanently bonding the temporarily bonded RFIC element to the antenna patterns.

According to another exemplary aspect of the method, during the step of temporarily bonding the RFIC element to a predetermined position of the antenna patterns, the RFIC element is conveyed in a second direction crossing the first direction.

According to yet another exemplary aspect of the method, at the step of temporarily bonding the RFIC element to a predetermined position of the antenna patterns, the RFIC element is conveyed in a second direction crossing the first direction by a plurality of uniaxial plotters arranged away from each other in the first direction.

According to yet another exemplary aspect of the method, at the step of temporarily bonding the RFIC element to a predetermined position of the antenna patterns, the RFIC element is sucked in a releasable manner and conveyed in the second direction.

According to yet another exemplary aspect of the method, at the step of temporarily bonding the RFIC element to a predetermined position of the antenna patterns, the RFIC element is sucked on the advancing side in the first direction relative to the center of the RFIC element and is conveyed in the second direction.

According to yet another exemplary aspect, the antenna base material is a base film having the plurality of antenna patterns.

According to yet another exemplary aspect, the base film is continuously supplied from a base film roll while the base film having the RFIC element permanently bonded thereon is collected in a roll shape.

According to yet another exemplary aspect, the antenna base material is paper.

According to yet another exemplary aspect, the paper has a prescribed display preliminarily printed thereon.

The exemplary RFID tag manufacturing apparatus and the method for manufacturing an RFID tag will now be described with reference to the accompanying drawings. In the drawings, substantially the same members are denoted by the same reference numerals.

First Embodiment

<RFID Tag Manufacturing Apparatus>

Figure 1:
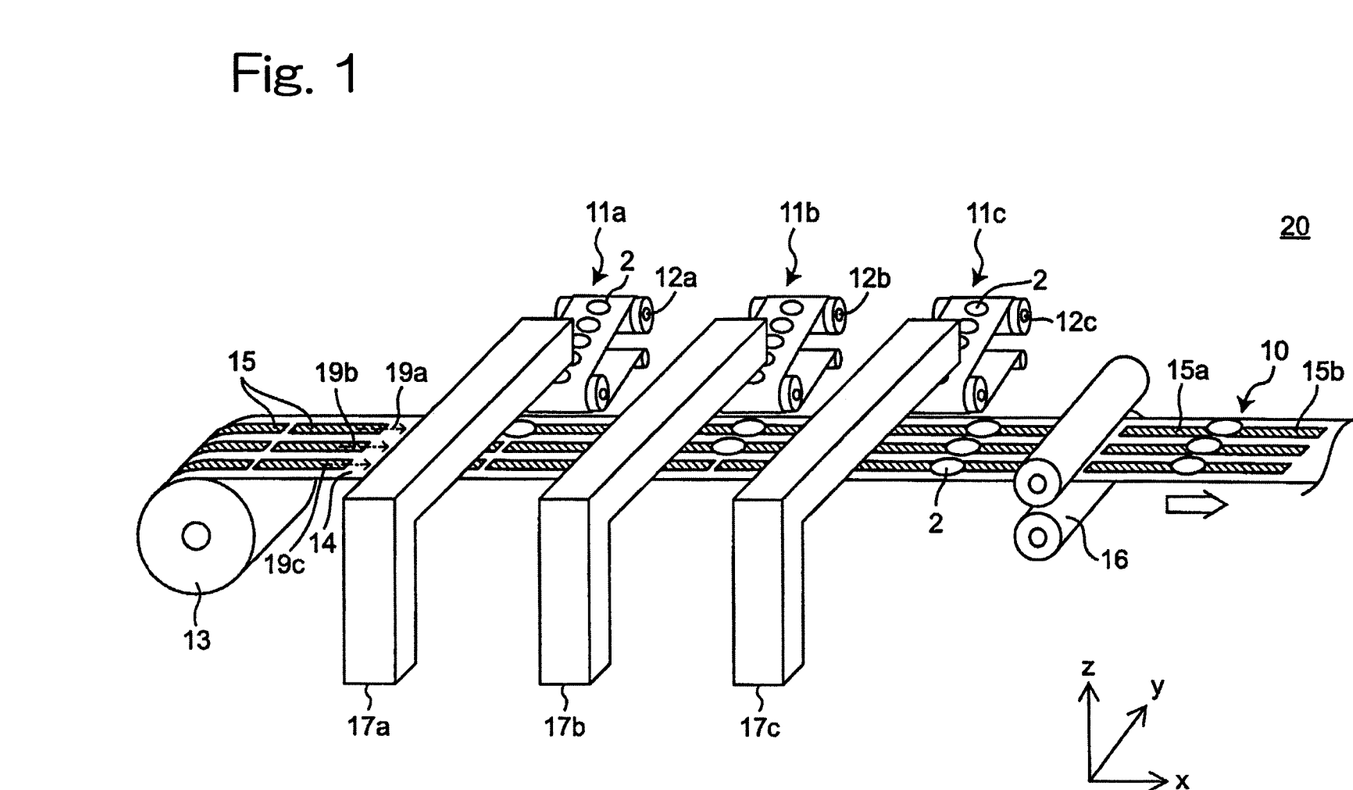
FIG. 1 is a schematic perspective view showing a configuration of an RFID tag manufacturing apparatus according to a first exemplary embodiment.
Figure 2:
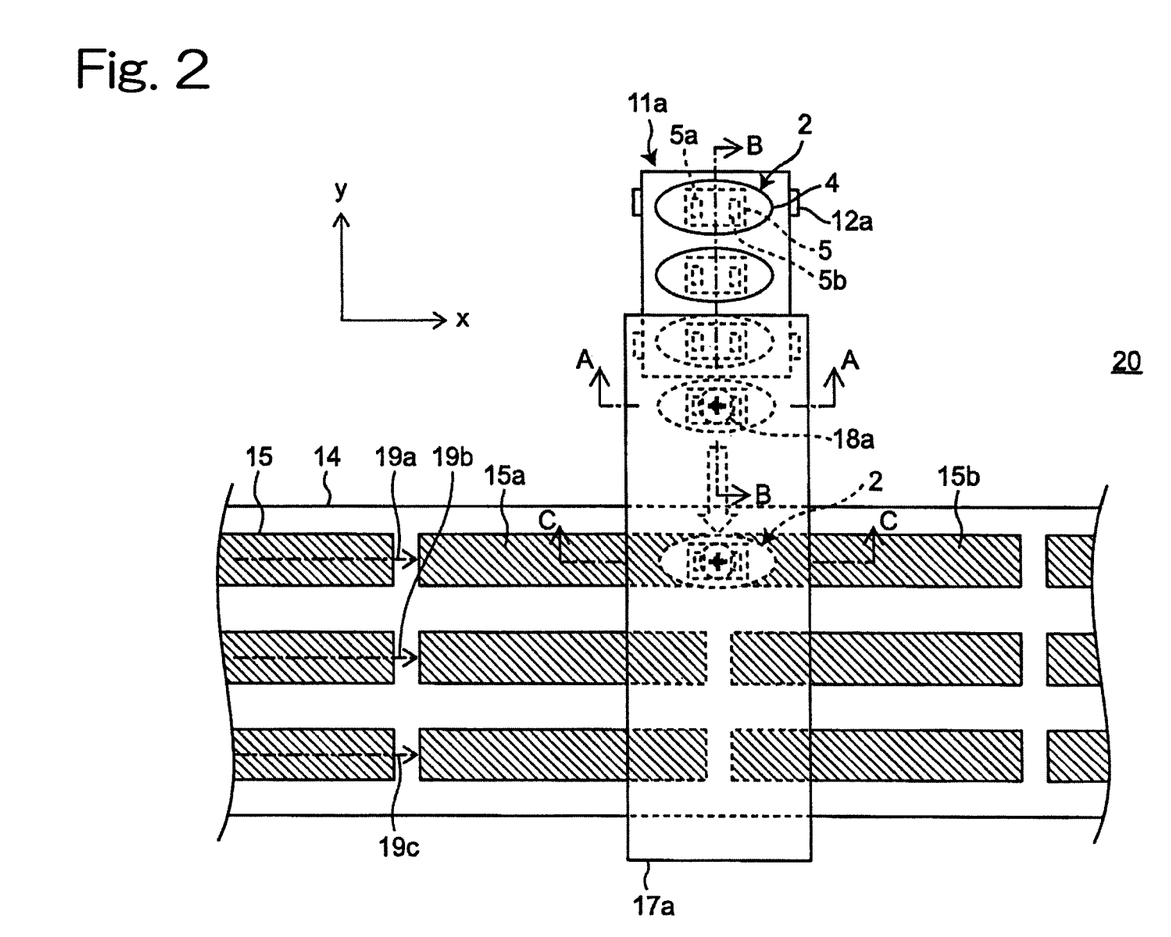
FIG. 2 is a schematic plan view showing how an RFIC element with a seal material is conveyed to an antenna pattern from one label dispenser constituting the RFID tag manufacturing apparatus of FIG. 1.

FIG. 1 is a schematic perspective view showing a configuration of an RFID tag manufacturing apparatus 20 according to a first exemplary embodiment. FIG. 2 is a schematic plan view showing how an RFIC element 2 with a seal material is conveyed to an antenna pattern 15 from one label dispenser 1a constituting the RFID tag manufacturing apparatus 20 of FIG. 1.

The RFID tag manufacturing apparatus 20 according to the first embodiment includes an antenna base material conveying part 13 (i.e., an antenna base material conveyor), conveying parts 11a, 11b, 11c (i.e., RFIC element conveyors) for RFIC elements with seal materials, uniaxial plotters 17a, 17b, 17c, and a pressurizing part 16 (i.e., a pressurizer). In the exemplary aspect, the antenna base material conveying part 13 is a supply roll and conveys an antenna base material 14 including multiple antenna patterns 15 extending in a first direction (x direction). Moreover, the conveying parts 11a, 11b, 11c for RFIC elements with seal materials are label dispensers and supply RFIC elements 2 with seal materials from rolls of wound tapes 3 housing the RFIC elements 2 with seal materials each having a seal material 4 attached to the other principal surface of an RFIC element 5 having terminal electrodes 5a, 5b for connection with the antenna pattern 15 on one principal surface. The uniaxial plotters 17a, 17b, 17c convey the supplied RFIC element 2 with a seal material in a second direction (i.e., the y direction) that crosses the first direction to a predetermined position of the antenna pattern 15 and temporarily bond the RFIC element 2 with a seal material to the antenna pattern 15. The pressurizing part 16 is a hold-down roll, for example, and applies a pressure to the temporarily bonded RFIC element 2 with a seal material to permanently bond the RFIC element 2 with a seal material to the antenna pattern 15.

According to the RFID tag manufacturing apparatus 20, the antenna pattern 15 is conveyed in the first direction (x direction), and the RFIC element 2 with a seal material is conveyed in the second direction (y direction, e.g., orthogonal to the x direction) to bond the RFIC element 2 with a seal material to the antenna pattern 15. Therefore, the movement of the antenna pattern 15 in the first direction (x direction) and the movement of the RFIC element 2 with a seal material in the second direction (y direction) are combined as movements in directions crossing each other. As a result, manufacturing of RFID tags can be improved in productivity. Specifically, the RFIC element 5 and the antenna pattern 15 can be aligned at a higher speed as compared to the pick-and-place process, and with sufficient accuracy. This is because arm portions of the uniaxial plotters 17a, 17b, 17c holding movable suction heads 18 are fixed, while only the suction heads 18 are made movable, so that the suction heads 18 can be reduced in weight. Additionally, since a distance is short between a moving device (such as a roller belt moving each of the suction heads 18) and the RFIC element 2 with a seal material of the suction head 18, smaller vibrations are generated in the suction head 18 due to an inertial force immediately after movement of the suction head, so that mounting position accuracy becomes higher when the suction head 18 is moved at a high speed. Although the RFID tag manufacturing apparatus 20 has a basic configuration of the roll-to-roll process, the pick-and-place process is partially combined to improve the accuracy of alignment between the RFIC element 5 and the antenna pattern 15.

Constituent members constituting the RFID tag manufacturing apparatus 20 will hereinafter be described.

<Antenna Base Material Conveying Part>

The antenna base material conveying part 13 is a supply roll 13, for example, and conveys in the first direction (x direction) the antenna base material (base film) 14 having multiple antenna patterns 15 formed thereon.

<Antenna Base Material (Base Film) and Antenna Pattern>

The base film 14 serving the antenna base material is made up of a member having flexibility such as polyethylene terephthalate (PET) and paper, for example. One principal surface is provided with the antenna patterns 52 made of copper foil, aluminum foil, or the like. It should be appreciated that a prescribed display may be printed on the antenna base (base film) 14 in advance.

A structure or a material excellent in air permeability may be used for the antenna base material 14. For example, a mesh structure or a perforated structure may be used. Alternatively, paper, cloth, or the like, which provides good air permeability, may be used. Air entrapment can be suppressed by using a structure or a material excellent in air permeability for the antenna substrate 14.

The antenna patterns 15 may have a rectangular shape, for example. Alternatively, the antenna patterns 15 may be formed in a meandering shape. In the first embodiment, the RFIC element 5 is mounted between two antenna patterns 15a, 15b to form a dipole RFID tag. The antenna pattern 15 may be formed by printing a conductive ink (e.g., Ag). The antenna base material (base film) 14 is not limited to a film-shaped continuous material and may be discrete materials. For example, antenna patterns may be printed on non-film-shaped articles such as discrete decorative boxes.

<Conveying Part for RFIC Element with Seal Material>

The conveying parts 11a, 11b, 11c for RFIC elements with seal materials are label dispensers, for example. The label dispenser 11a, 11b, 11c supply the RFIC elements 2 with seal materials from the tapes 3 housing the RFIC elements 2 with seal materials each having the seal material 4 attached to the other principal surface of the RFIC element 5 having the terminal electrodes 5a, 5b for connection with the antenna pattern 15 on one principal surface.

<Tape>

Figure 3A:
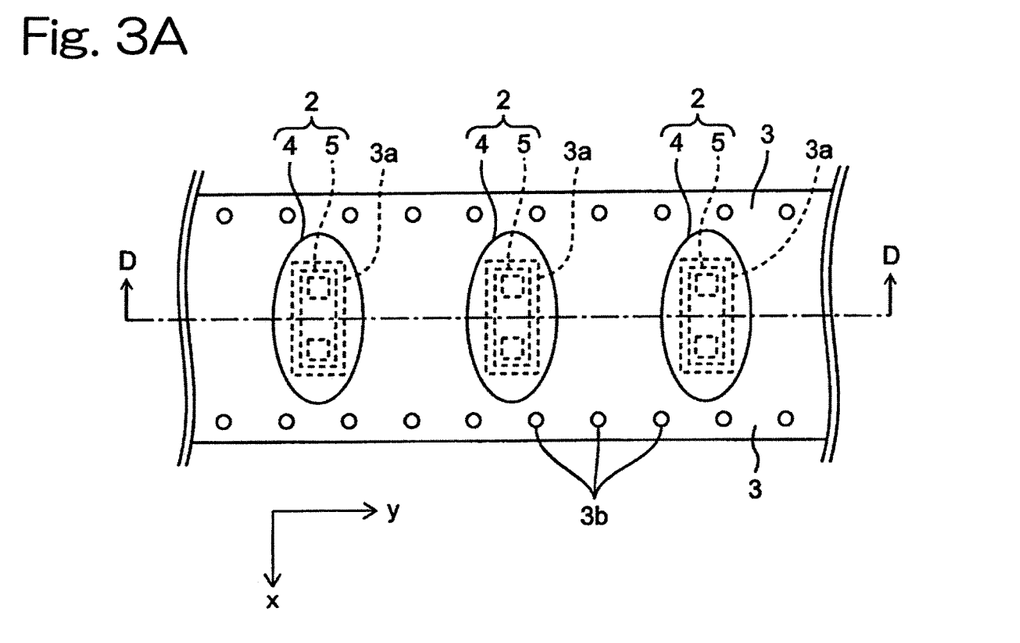
FIG. 3A is a plan view showing an overview of a tape housing RFIC elements with seal materials.
Figure 3B:
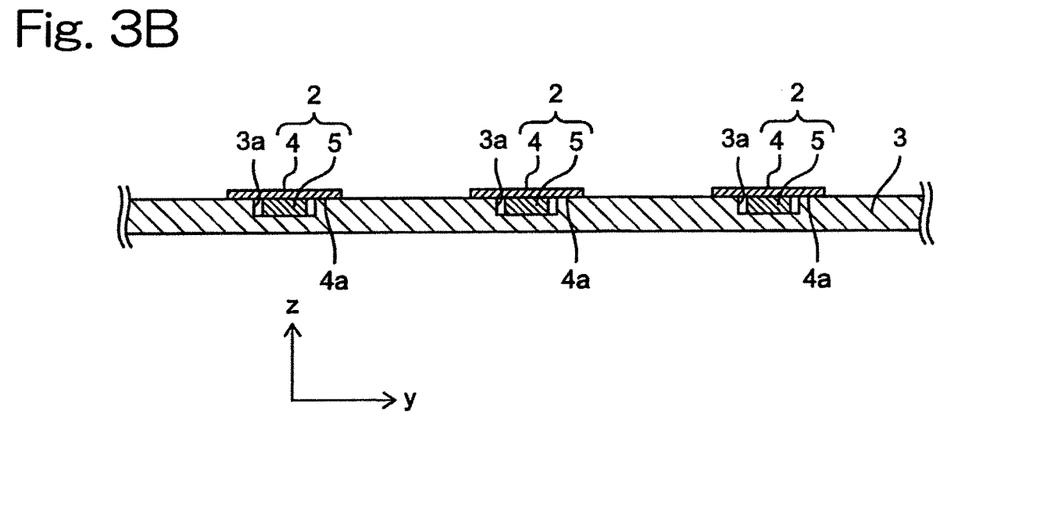
FIG. 3B is a cross-sectional view in a direction D-D of FIG. 3A.

FIG. 3A is a plan view showing an overview of the tape 3 housing the RFIC elements 2 with seal materials. FIG. 3B is a cross-sectional view in a direction D-D of FIG. 3A. The tape 3 is a belt-shaped member having multiple bottomed housing holes 3a on one principal surface. The multiple housing holes 3a are disposed along the longitudinal direction of the tape 3. The arrangement intervals of the housing holes 3a are equal intervals, for example. The housing holes 3a have a size slightly larger than the RFIC elements 5 so that the RFIC elements 5 are entirely housed in a planar view while a gap of about 0.1 to 2 mm, for example, is formed around the RFIC elements 5. The "planar view" in this case refers to a state viewed in the direction shown in FIG. 1 (i.e., orthogonal to a principal surface of tape 3). The tape 3 is made up of a member having flexibility such as polyethylene terephthalate (PET) and paper, for example. The thickness of the tape 3 is 50 to 800 µm, for example. In the first embodiment, the depth of the housing holes 3a is equivalent to the thickness of the RFIC elements 5. The both end parts in the width direction of the tape 3 are provided with multiple feed holes 3b in the longitudinal direction of the tape 3. Suction holes may be opened for temporarily sucking and fixing the RFIC elements 5 until the RFIC elements are fixed by the seal materials 4 after putting the RFIC elements 5 in bottom portions of the housing holes 3a.

<RFIC Element with Seal Material>

The RFIC element 2 with a seal material is formed by attaching the seal material 4 to be affixed to the RFIC element 5. In the RFIC element 2 with a seal material, the RFIC element 5 is housed in the housing hole 3a and bonded to the adhesive layer 4a of the seal material 4.

<Seal Material>

Figure 4A:
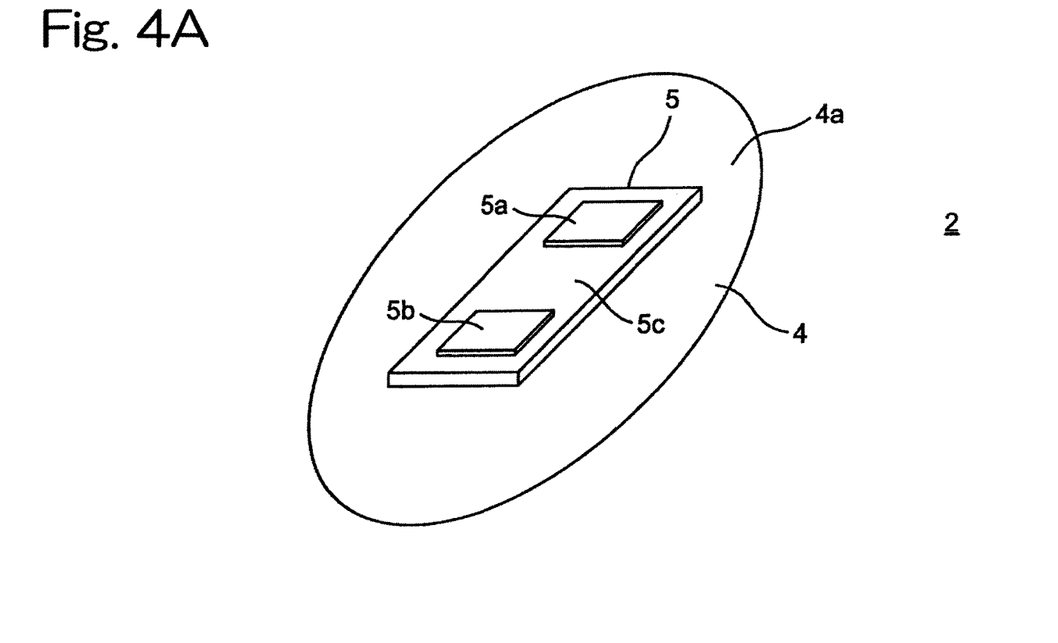
FIG. 4A is a schematic perspective view showing a configuration of an RFIC element with a seal material.
Figure 4B:
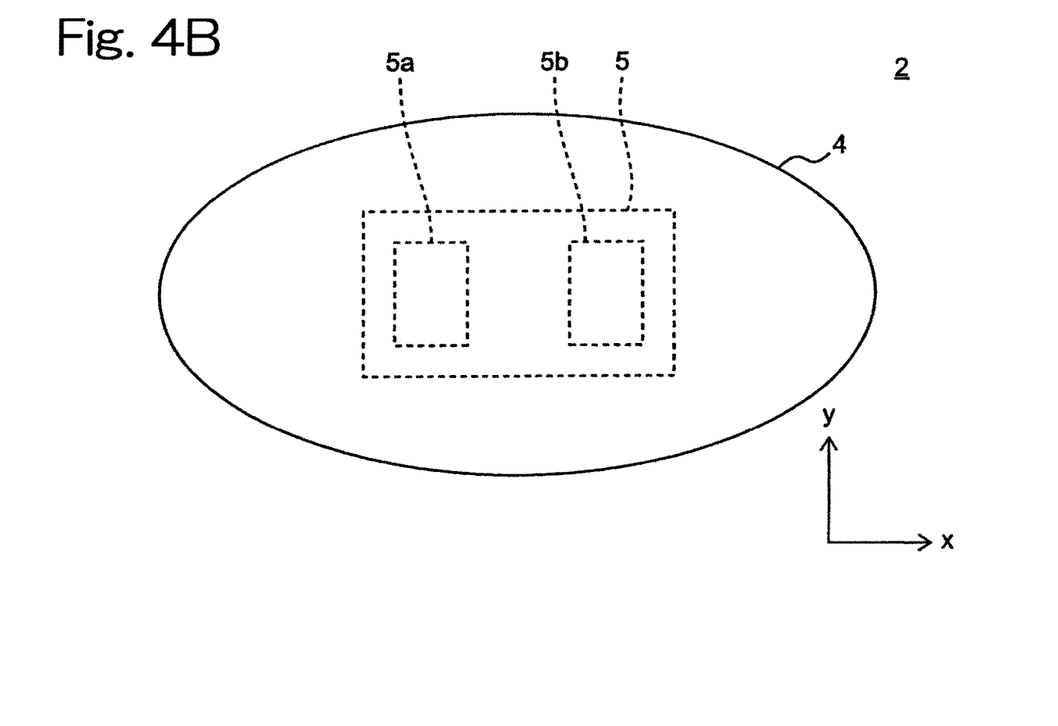
FIG. 4B is a plan view of the RFIC element with a seal material of FIG. 4A.

FIG. 4A is a schematic perspective view showing a configuration of the RFIC element 2 with a seal material. FIG. 4B is a plan view of the RFIC element 2 with a seal material of FIG. 4A.

The seal material 4 has an adhesive layer 4a on one principal surface. The adhesive layer 4a is formed entirely on the one principal surface of the seal material 4, for example. The seal material 4 is disposed to cover a surface on which the first terminal electrode 5a and the second terminal electrode 5b of the RFIC element 5 are not disposed, for example.

The seal material 4 is affixed to one principal surface of the tape 3 such that the adhesive layer 4a is exposed in each of the housing holes 3a of the tape 3. The one principal surface of the tape 3 is subjected to a release treatment for facilitating peeling of the seal material 4. In the first embodiment, the seal material 4 is formed into a size larger than the housing hole 3a so as to completely cover the housing hole 3a.

By affixing the seal material 4 to the antenna patterns 15a, 15b, electrical connection is maintained between the antenna patterns 15a, 15b that are an example of a connection object and the terminal electrodes 5a, 5b of the RFIC element 5. Therefore, in this embodiment, the seal material 4 is a member configured to hold and attach the RFIC element to the antenna base material, and the seal material itself has no electric circuit such as a wiring pattern disposed thereon.

According to an exemplary aspect, the seal material 4 is made of a member having flexibility and elasticity such as polyethylene, polypropylene, polyvinyl butyral (PVB), and paper, for example. The thickness of the seal materials 4 is 20 to 200 µm, for example.

By making the seal material 4 from paper, air entrapment can be suppressed when the RFID tag is formed.

Although the seal material 4 shown in FIGS. 4A and 4B has an elliptical shape, the exemplary embodiment is not limited thereto, and the seal material may have various shapes such as a rectangular shape and a circular shape as would be appreciated to one skilled in the art.

<RFIC Element>

Figure 5A:
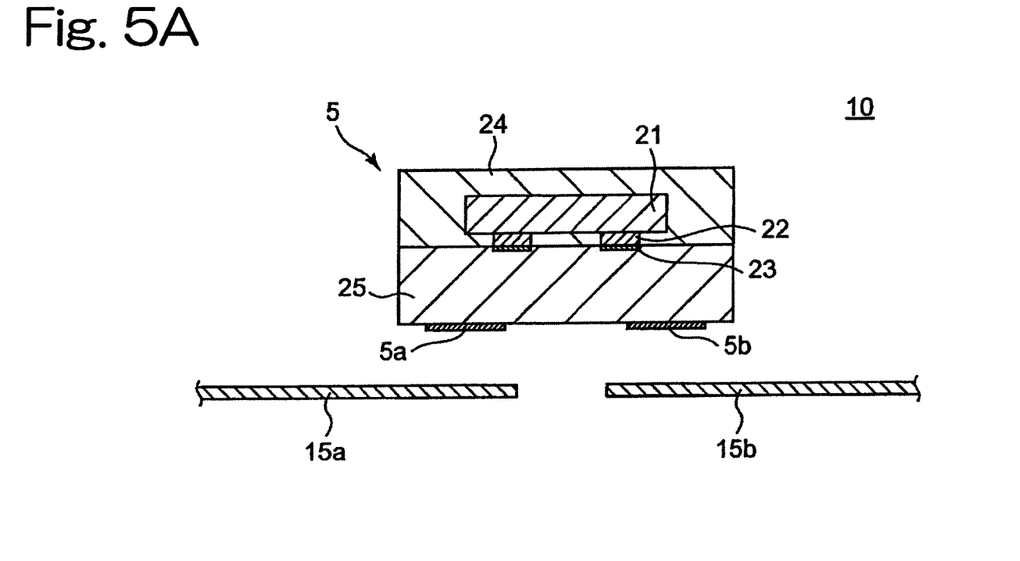
FIG. 5A is a schematic cross-sectional view showing a configuration of an RFIC element.
Figure 5B:
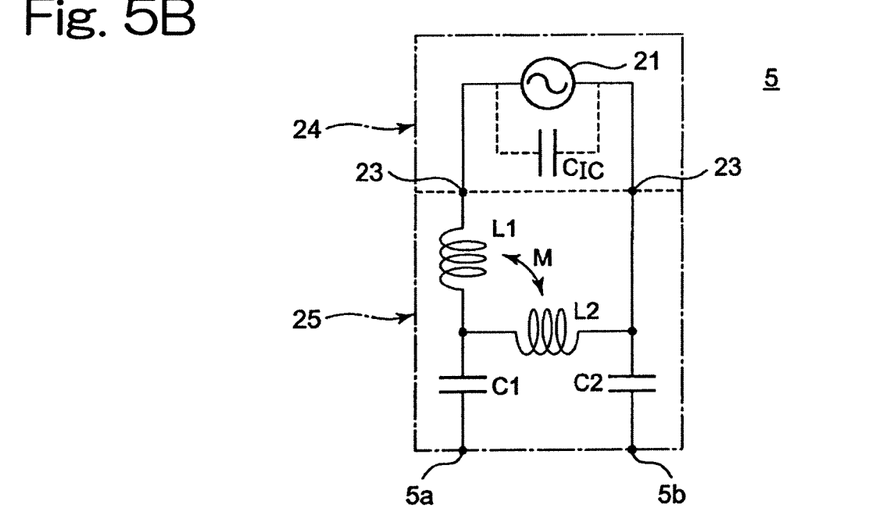
FIG. 5B is an equivalent circuit diagram of the RFIC element of FIG. 5A.

FIG. 5A is a schematic cross-sectional view showing a configuration of the RFIC element 5 of FIG. 4A. FIG. 5B is an equivalent circuit diagram of the RFIC element 5 of FIG. 5A.

The RFIC element 5 is a tag IC utilized in a UHF-band RFID system and is a package or a strap with an RFIC chip sealed therein, for example. As shown in FIG. 4A, the RFIC element 5 has the first terminal electrode 5a and the second terminal electrode 5b on a surface on the side opposite to a fixation surface fixed to the adhesive layer 4a of the seal material 4. The height (thickness) of the electronic components 5 is 50 µm to 1 mm, for example. The RFIC element 5 is source-tagged in advance.

As shown in FIG. 5A, the RFIC element 5 includes an RFIC chip 21 and a multilayer substrate 25 connected to the RFIC chip 21 via a conductive bonding material 22 and a terminal electrode 23. The RFIC chip 21 is sealed with a sealing resin 24. The multilayer substrate 25 has a built-in power feeding circuit made up of inductor patterns such as L1 and L2 and capacitor patterns such as C1 and C2. $C_{IC}$ is a stray capacitance of the RFIC chip 21. A resonance circuit is formed by the power feeding circuit and has a resonance frequency corresponding to a carrier frequency. By disposing the power feeding circuit as described above, the center frequency of the carrier frequency can be prevented from significantly changing even if the electric length of the antenna pattern 15 changes. Therefore, by setting the electrical lengths of the antenna patterns 15a, 15b in the initial state to a maximum gain state ($\lambda/2$), slight changes in the electrical lengths of the antenna patterns 15a, 15b cause only a reduction in communicable distance so that the same carrier frequency can be used for reading.

<Uniaxial Plotter (Plotter)>

As shown in FIG. 2, the uniaxial plotter 17a conveys the supplied RFIC element 2 with a seal material in the second direction (y direction) crossing the first direction (x direction) to a predetermined position of the antenna pattern 15. Specifically, the RFIC element 2 with a seal material is conveyed between the two antenna patterns 15a, 15b. Subsequently, the RFIC element 2 with a seal material is temporarily bonded to the antenna pattern 15.

It is noted that the term "temporary bonding" according to the present disclosure means a state in which the RFIC element 2 with a seal material is temporarily fixed between the two antenna patterns 15a, 15b. For example, this can be defined as a state in which the RFIC element 2 with a seal material is moved from between the two antenna patterns 15a, 15b by applying an external force. Specifically, a portion of the seal material 4 covering the RFIC element 5 may be attached to the antenna pattern 15 or the antenna base material 14 around the antenna pattern 15 in this state. In this temporarily bonded state, the terminal electrodes 5a, 5b of the RFIC element 5 and the antenna patterns 15a, 15b may not necessarily be electrically connected. For example, the uniaxial plotter 17a can bring the seal material 4 into contact with the antenna pattern 15 to temporarily bond the RFIC element 2 with a seal material to the antenna pattern 15.

The uniaxial plotter 17a may be one of a plurality (i.e., multiple) uniaxial plotters. For example, the multiple uniaxial plotters 17a, 17b, 17c arranged in the first direction (x direction) may be included. Preferably, the multiple uniaxial plotters 17a, 17b, 17c are arranged in the conveying direction of the base film 14 according to the number of rows of the antenna patterns 15 on the antenna base (base film) 14. This enables an improvement in process speed so that RFID tags 10 can be manufactured at higher speed.

The uniaxial plotters 17a, 17b, 17c may each have the suction head 18 capable of sucking and releasing the RFIC element 2 with a seal material and capable of conveying the RFIC element 2 with a seal material in the second direction (y direction) 18. For example, the suction head 18 can suck the RFIC element 2 with a seal material by a central suction port. The suction head 18 is movable in the y direction and the z direction. The suction head 18 may be rotatable around the z-axis. As a result, the RFIC element 2 with a seal material can be arranged in a desired direction by rotating the suction head 18 around the z-axis regardless of the direction in which the RFIC element 2 with a seal material is conveyed by the label dispensers 11a, 11b, 11c. in an x-y plane.

Instead of the uniaxial plotters, biaxial plotters movable in the x direction and the y direction may be used as needed. Alternatively, other plotters may be used.

<Pressurizing Part>

The pressurizing part 16 is the hold-down roll 16, for example, and applies a pressure to the temporarily bonded RFIC element 2 with a seal material so that the RFIC element 2 with a seal material is permanently bonded to the antenna patterns 15a, 15b.

It is noted that the term "permanent bonding" corresponds to the term "temporarily bonding" as described above and is a state in which the RFIC element 2 with a seal material is fixed between the two antenna patterns 15a, 15b. For example, this can be defined as a state in which the RFIC element 2 with a seal material is not moved from between the two antenna patterns 15a, 15b even if an external force is applied to a level at which the element is moved in the case of the temporary bonding.

As a result, as shown in FIG. 5A, the RFID tag 10 can be formed by connecting the first terminal electrode of the RFIC element 5 to the antenna pattern 15a and connecting the second terminal electrode 5b to the antenna pattern 15b.

The pressurizing part 16 is not limited to the hold-down roll and may be a uniaxial press part.

<Method for Manufacturing RFID Tag>

A method for manufacturing an RFID tag according to the first exemplary embodiment includes the following steps.

The antenna base material 14 including the multiple antenna patterns 15 is conveyed along a line 19a in the first direction (x direction) (FIGS. 1 and 2).

The antenna base material 14 may be conveyed continuously or in a batch process in which the conveying is stopped after movement to a temporary bonding position and a permanent bonding position.

Figure 6A:
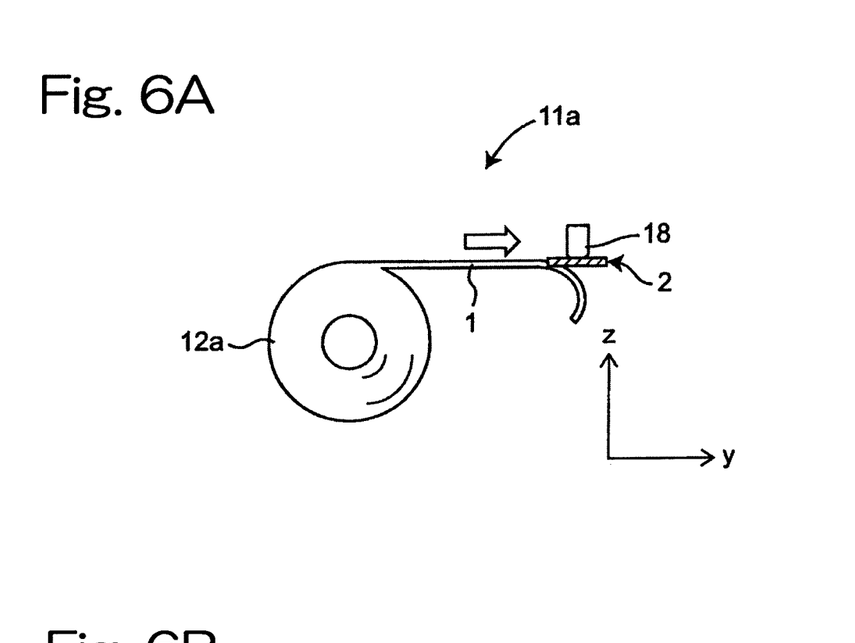
FIG. 6A is a schematic side view showing how the RFIC element with a seal material is supplied from the label dispenser.

The RFIC element 2 with a seal material is supplied from a roll of the wound tape 3 housing the RFIC element 2 with a seal material having the seal material 4 attached to the other principal surface of the RFIC element 5 having the terminal electrodes 5a, 5b for connection with the antenna pattern 15 on one principal surface. FIG. 6A is a schematic side view showing how the RFIC element 2 with a seal material is supplied from the label dispenser 11a.

Figure 6B:
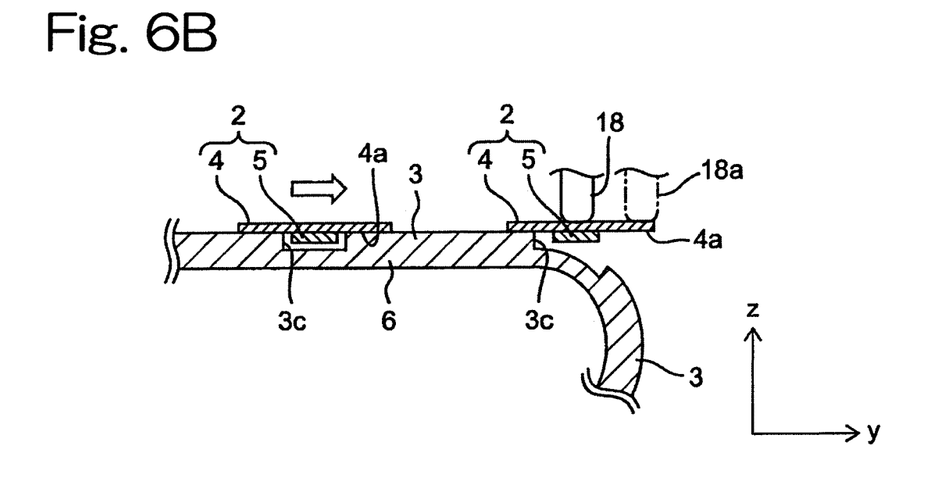
FIG. 6B is a partially enlarged cross-sectional view of FIG. 6A.

FIG. 6B is a partially enlarged cross-sectional view of FIG. 6A. As shown in FIGS. 6A and 6B, the RFIC element 2 with a seal material is picked up by the suction head 18 of the uniaxial plotter 17a from the tape 3 housing the RFIC element 2 with a seal material. As shown in FIG. 6B, at the time of picking up, the tape 3 is bent so that the RFIC element 2 with a seal material is easily released from the tape 3.

As shown in FIG. 6B, a suction head 18a may suck the RFIC element 2 with a seal material at a position shifted in the y direction from the center thereof. Sucking at a position shifted in the y direction from the center in this way results in a method of peeling the RFIC element 2 with a seal material in which an edge portion of the seal material 4 is first peeled from the tape 3, and therefore, peeling performance is improved at the time of high-speed peeling, so that the RFIC element 2 with a seal material is more easily picked up.

Figure 7A:
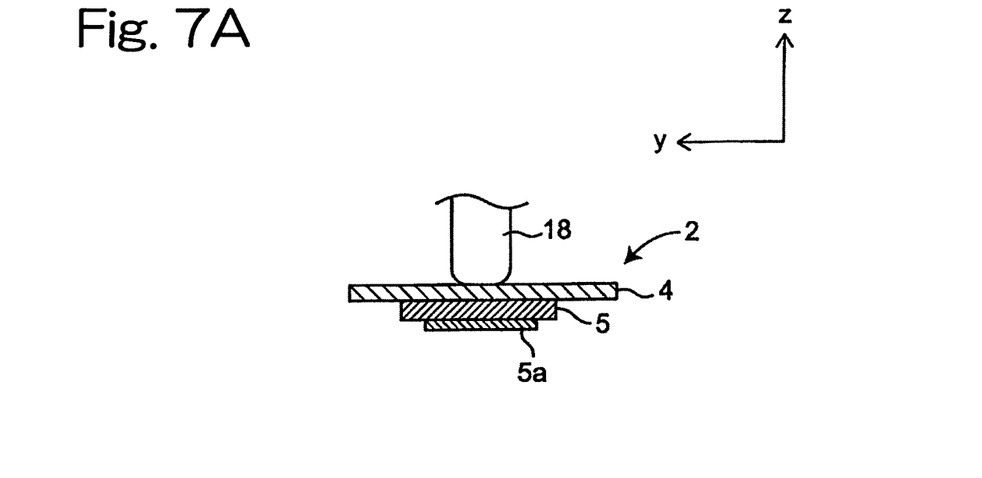
FIG. 7A is a partial cross-sectional view of the RFIC element with a seal material and a suction head as viewed in a direction A-A of FIG. 2.
Figure 7B:
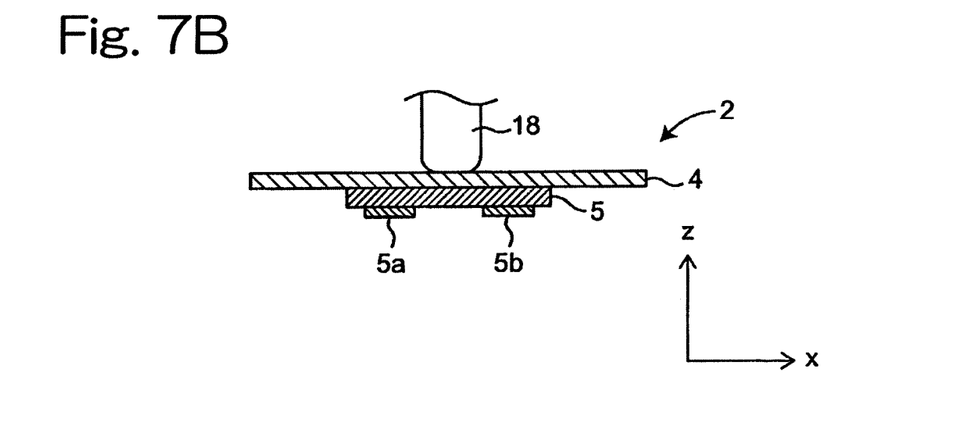
FIG. 7B is a partial cross-sectional view of the RFIC element with a seal material and the suction head as viewed in a direction B-B of FIG. 2.

FIG. 7A is a partial cross-sectional view of the RFIC element 2 with a seal material and the suction head 18 as viewed in a direction A-A of FIG. 2. FIG. 7B is a partial cross-sectional view of the RFIC element 2 with a seal material and the suction head 18 as viewed in a direction B-B of FIG. 2. As shown in FIGS. 7A and 7B, the suction head 18 sucks substantially the center of the RFIC element 2 with a seal material.

The supplied RFIC element with a seal material is conveyed in the second direction (y direction) crossing the first direction (x direction) and temporarily bonded to predetermined positions of the antenna patterns 15a, 15b.

Figure 8A:
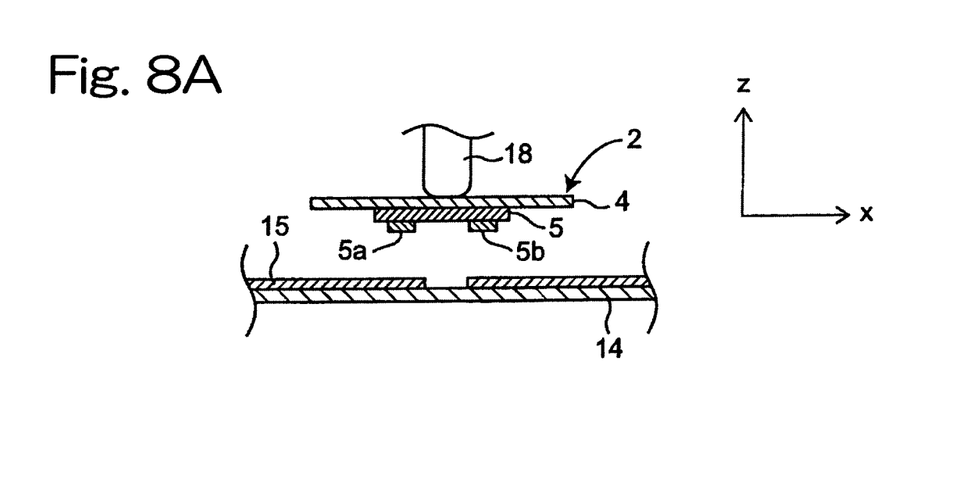
FIG. 8A is a partial cross-sectional view of the RFIC element with a seal material, the suction head, and antenna patterns as viewed in a direction C-C of FIG. 2.
Figure 8B:
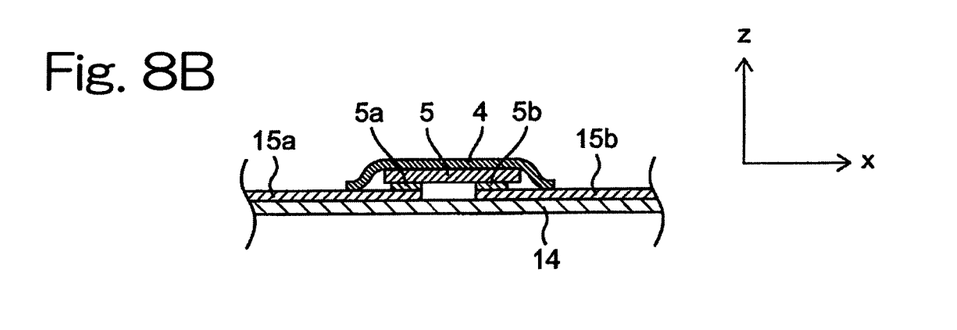
FIG. 8B is a partial cross-sectional view showing the RFIC element with a seal material temporarily bonded to the antenna patterns.
Figure 8C:
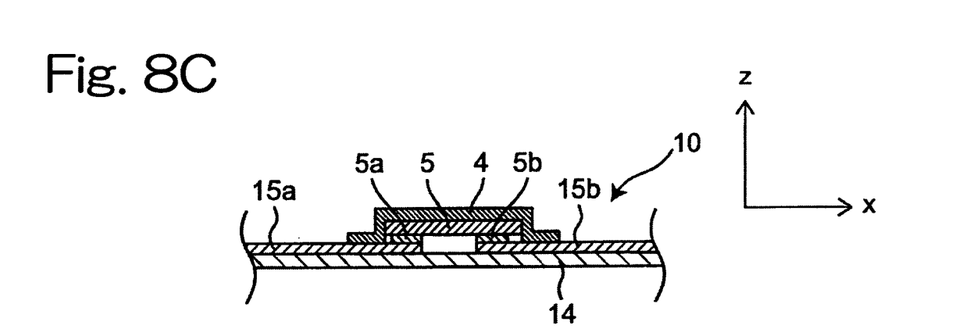
FIG. 8C is a partial cross-sectional view showing an RFID tag having the RFIC element with a seal material permanently bonded to the antenna patterns.

FIG. 8A is a partial cross-sectional view of the RFIC element 2 with a seal material, the suction head 18, and the antenna patterns 15a, 15b as viewed in a direction C-C of FIG. 2. FIG. 8B is a partial cross-sectional view showing the RFIC element 12 with a seal material temporarily bonded to the antenna patterns 15a, 15b. As shown in FIGS. 8A and 8B, the RFIC element 2 with a seal material is sucked by the suction head 18, conveyed in the second direction (y direction (negative direction)), and disposed between the two antenna patterns 15a, 15b. This is followed by vertically downward movement (in the z direction (negative direction)) to bring the first terminal electrode 5a of the RFIC element 5 into contact with the antenna pattern 15a and bring the second terminal electrode 5b into contact with the antenna pattern 15b, and the RFIC element 2 with a seal material is released. Subsequently, the RFIC element 2 with a seal material is temporarily bonded by the seal material 4 between the two antenna patterns 15a, 15b.

When the RFIC element 2 with a seal material is only separated from the suction head 18, the seal material 4 is lightly placed on the antenna pattern 15 (temporarily fixed state: temporary bonding), and the RFIC element 2 with a seal material is not yet permanently bonded to the antenna pattern 15a, 15b. Additionally, in the temporarily bonded state, the electrical connection may not be achieved due to a gap between the first terminal electrode 5a of the RFIC element 5 and the antenna pattern 15a or a gap between the second terminal electrode 5b and the antenna pattern 15b. Therefore, the subsequent permanent bonding is required.

The temporarily bonded RFIC element 2 with a seal material is permanently bonded to the antenna patterns 15a, 15b. Specifically, the temporarily bonded RFIC element 2 with a seal material is pressed down by the hold-down roll 16 for the permanent bonding (sealing). The permanent bonding is performed at a place different from the place of the temporary bonding. Specifically, the temporary bonding and the permanent bonding are performed at two positions separated in the x direction, which is the conveying direction of the antenna patterns 15a, 15b. Therefore, the temporary bonding and the permanent bonding can separately be performed, so that the productivity can be improved.

In this case, to prevent air entrapment at the time of the permanent bonding, a structure or a material excellent in air permeability is preferably used for the seal material 4. For example, a mesh structure or a perforated structure and a material excellent in air permeability such as paper and cloth are preferable. Furthermore, a structure or a material excellent in air permeability is preferably used for the antenna base material (base film) 14 as well. For example, paper etc. are preferable. If both the seal material 4 and the antenna base material (base film) 14 are resin-based (e.g., made of PET resin), an air vent hole is preferably formed in the antenna base material (base film) 14 to prevent the air entrapment at the time of the permanent bonding.

As a result, the RFID tag 10 can inexpensively be manufactured with good productivity while ensuring the mounting position accuracy of the RFIC element 5 for the antenna pattern 15a, 15b. The RFID tag 10 may be an RFID tag having a communication frequency of 900 MHz band, for example.

Second Embodiment

Figure 9:
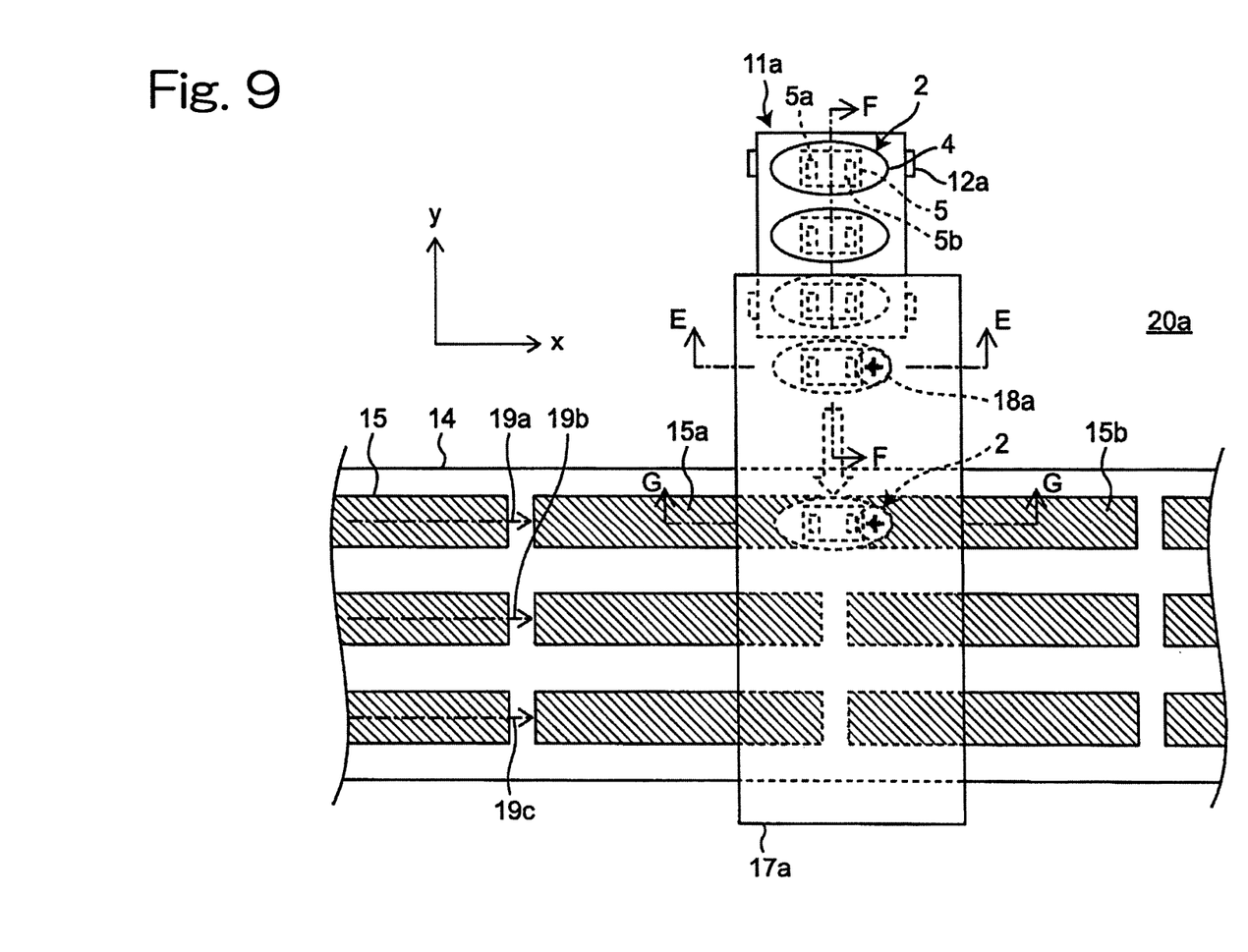
FIG. 9 is a schematic plan view showing how the RFIC element with a seal material is conveyed to the antenna pattern from one label dispenser constituting an RFID tag manufacturing apparatus according to a second exemplary embodiment.
Figure 10A:
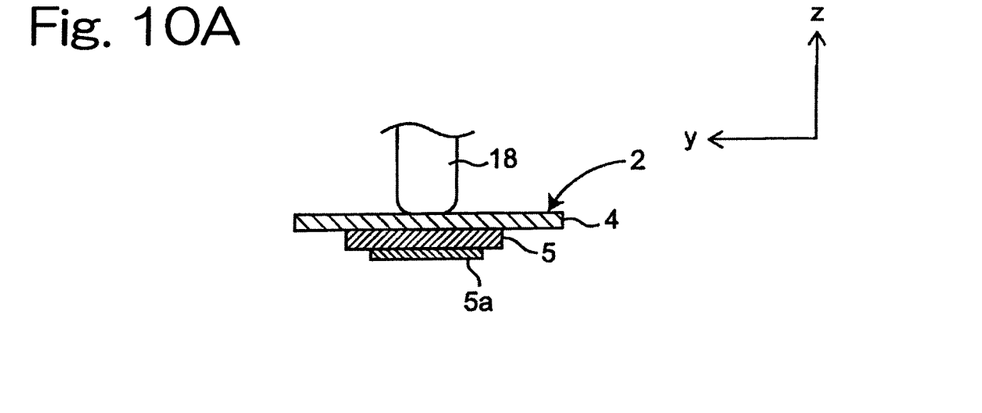
FIG. 10A is a partial cross-sectional view of the RFIC element with a seal material and the suction head as viewed in a direction E-E of FIG. 9.
Figure 10B:
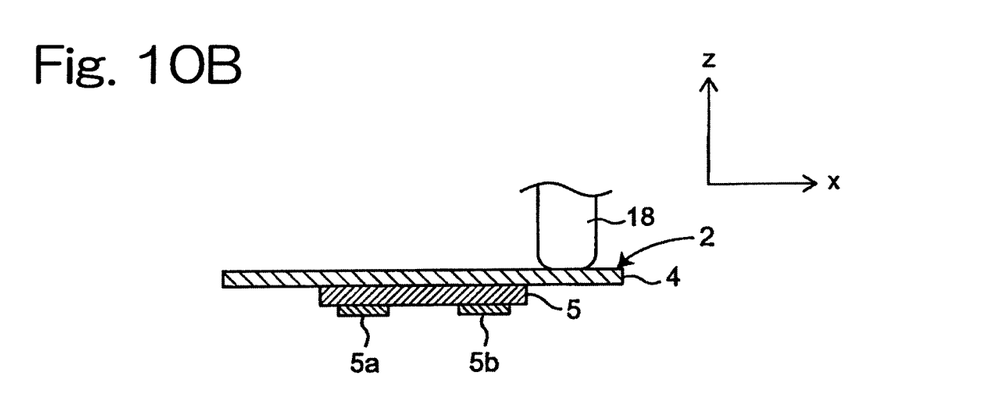
FIG. 10B is a partial cross-sectional view of the RFIC element with a seal material and the suction head as viewed in a direction F-F of FIG. 9.
Figure 11A:
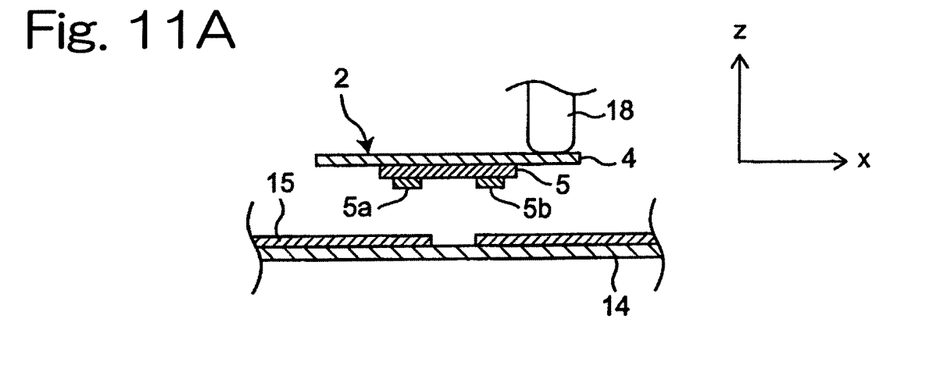
FIG. 11A is a partial cross-sectional view of the RFIC element with a seal material, the suction head, and the antenna patterns as viewed in a direction G-G of FIG. 9.
Figure 11B:
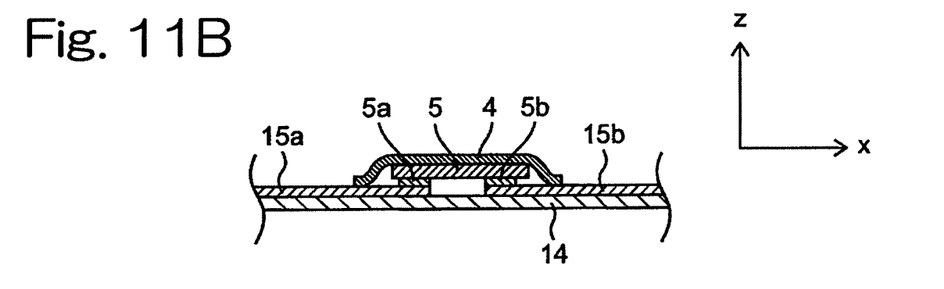
FIG. 11B is a partial cross-sectional view showing the RFIC element with a seal material temporarily bonded to the antenna patterns.
Figure 11C:
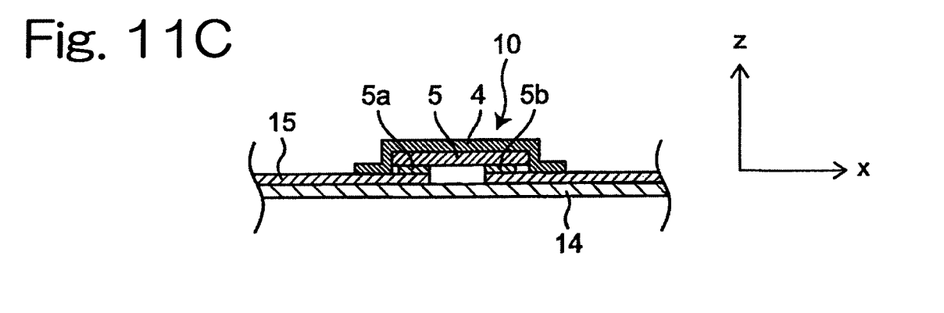
FIG. 11C is a partial cross-sectional view showing the RFID tag having the RFIC element with a seal material permanently bonded to the antenna patterns.

FIG. 9 is a schematic plan view showing how the RFIC element 2 with a seal material is conveyed onto the antenna pattern 15 from the one label dispenser 11a constituting an RFID tag manufacturing apparatus 20a according to a second embodiment. FIG. 10A is a partial cross-sectional view of the RFIC element 2 with a seal material and the suction head 18 as viewed in a direction E-E of FIG. 9. FIG. 10B is a partial cross-sectional view of the RFIC element 2 with a seal material and the suction head 18 as viewed in a direction F-F of FIG. 9. FIG. 11A is a partial cross-sectional view of the RFIC element 2 with a seal material, the suction head 18, and the antenna patterns 15a, 15b as viewed in a direction G-G of FIG. 9. FIG. 11B is a partial cross-sectional view showing the RFIC element 12 with a seal material temporarily bonded to the antenna patterns 15a, 15b. FIG. 11C is a partial cross-sectional view showing the RFID tag 10 having the RFIC element 2 with a seal material permanently bonded to the antenna patterns 15a, 15b.

As shown in FIGS. 9 and 10B, the RFID tag manufacturing apparatus 20a according to the second embodiment is different from the RFID tag manufacturing apparatus according to the first embodiment in position at which the suction head 18 of the uniaxial plotter 17a is disposed. Specifically, the suction head 18 is disposed at a position where the RFIC element 2 with a seal material is sucked on the advancing side in the first direction (x direction) relative to the center of the RFIC element 2 with a seal material and is conveyed in the second direction (y direction).

A method for manufacturing the RFID tag according to the second embodiment is different from the method for manufacturing the RFID tag according to the first embodiment in the position of suction of the RFIC element 2 with a seal material in the process of temporarily bonding the RFIC element 2 with a seal material to predetermined positions of the antenna patterns 15a, 15b. Specifically, the difference is that the RFIC element 2 with a seal material is sucked on the advancing side in the first direction (x direction) relative to the center of the RFIC element 2 with a seal material and is conveyed in the second direction (y direction).

As described above, by sucking the RFIC element 2 with a seal material on the advancing side in the first direction (x direction) relative to the center of the RFIC element 2 with a seal material, the temporary bonding of the RFIC element 2 with a seal material becomes easier. Specifically, when the RFIC element 2 with a seal material is conveyed onto the antenna patterns 15a, 15b while being sucked by the suction head 18, the RFIC element 2 with a seal material is inclined. As a result, the seal material 4 comes into contact with the antenna pattern 15a on the side opposite to the advancing side in the first direction (x direction). This is followed by vertically downward movement (in the z direction (negative direction)) to bring the first terminal electrode 5a of the RFIC element 5 into contact with the antenna pattern 15a and bring the second terminal electrode 5b into contact with the antenna pattern 15b, and the RFIC element 2 with a seal material is released from the suction head 18. As a result, since the seal material 4 is already in contacted with the antenna pattern 15a, the temporary bonding with the seal material 4 can more easily be performed.

When the RFIC element 2 with a seal material is picked up from the label dispenser 11a by the suction head 18, the RFIC element 2 with a seal material is sucked on the advancing side in the first direction (x direction) relative to the center thereof and therefore can stably be sucked. Specifically, the peeling of the adhesive layer 4a of the seal material 4 from the tape 3 is started on the advancing side in the first direction (x direction) relative to the center. This can stabilize the sucking of the RFIC element 2 with a seal material by the suction head 18.

Additionally, since the RFIC element 2 with a seal material is sucked on the advancing side in the first direction (x direction) relative to the center, the adhesive layer 4a of the seal material 4 is present under the sucked position. Therefore, when the RFIC element 2 with a seal material is temporarily bonded, the adsorption head 18 can be moved vertically downward to reliably bond the seal material 4 to the antenna pattern 15 or the antenna base material 14 around the antenna pattern 15.

The present disclosure includes appropriately combining arbitrary embodiments and/or examples of the various embodiments and/or examples described above, and the effects of the respective embodiments and/or examples can be produced.

According to the RFID tag manufacturing apparatus and the method for manufacturing an RFID tag according to the present invention, manufacturing of RFID tags can be improved in productivity.

EXPLANATIONS OF LETTERS OR NUMERALS

2 RFIC element with a seal material
3 tape
3a housing hole
3b feed hole
4 seal material
4a adhesive layer
5 RFIC element
5a first terminal electrode
5b second terminal electrode
5c substrate (multilayer substrate)
10 RFID tag
11a, 11b, 11c label dispenser
12 supply roll
13 supply roll
14 base film (antenna base material)
15 antenna pattern
15a antenna pattern (first radiating element)
15b antenna pattern (second radiating element)
16 hold-down roll
17 uniaxial plotter (plotter)
18, 18a suction head
19a, 19b, 19c line
20, 20a RFID tag manufacturing apparatus
21 RFIC chip
22 conductive bonding material
23 terminal electrode
24 sealing resin
25 multilayer substrate

The invention claimed is:

1. An apparatus for manufacturing an RFID tag, the apparatus comprising:
an antenna base material conveyor configured to convey an antenna base material that includes a plurality of antenna patterns extending in a first direction;
an RFIC element conveyor configured to supply an RFIC element having terminal electrodes for connection with the antenna patterns on a one principal surface thereof;
a plotter that includes a movable suction head and that is configured to position the supplied RFIC element to a predetermined position on the antenna patterns, such that the RFIC element is temporarily bonded to the antenna patterns; and
a pressurizer configured to apply a pressure to the temporarily bonded RFIC element to permanently bond the RFIC element to the antenna patterns,
wherein the plotter is a uniaxial plotter configured to convey the supplied RFIC element to a predetermined position of the antenna patterns in a second direction crossing the first direction,
wherein the movable suction head of the uniaxial plotter is configured to suck the RFIC element towards the antenna patterns to be temporarily bonded thereto and then release the RFIC element before the RFIC element is permanently bonded by the pressurizer to the antenna patterns, and
wherein the first direction is an X axis direction and the movable suction head is movable in Y axis and Z axis directions that are orthogonal to the X axis direction, respectively, such that the movable suction head is rotatable in the Z axis direction.

2. The apparatus according to claim 1, wherein the pressurizer is a hold-down roll configured to apply the pressure to the temporarily bonded RFIC element with a seal material to permanently bond the RFIC element to the antenna pattern.

3. An apparatus for manufacturing an RFID tag, the apparatus comprising:
- an antenna base material conveyor configured to convey an antenna base material that includes a plurality of antenna patterns extending in a first direction;
- an RFIC element conveyor configured to supply an RFIC element having terminal electrodes for connection with the antenna patterns on a one principal surface thereof;
- a plotter that includes a movable suction head and that is configured to position the supplied RFIC element to a predetermined position on the antenna patterns, such that the RFIC element is temporarily bonded to the antenna patterns; and
- a pressurizer configured to apply a pressure to the temporarily bonded RFIC element to permanently bond the RFIC element to the antenna patterns,
- wherein the plotter includes a plurality of uniaxial plotters configured to convey the supplied RFIC element to the predetermined position of the antenna patterns in a second direction crossing the first direction, and
- wherein each of the plurality of uniaxial plotters has fixed arm extending in the second direction that is orthogonal to the first direction.

4. The apparatus according to claim 3, wherein each of the plurality of uniaxial plotters comprises a respective suction head configured to suck and releases a respective RFIC element and is configured to conveys the respective RFIC element in the second direction.

5. The apparatus according to claim 4, wherein the suction head of each uniaxial plotter is disposed at an advancing side in the first direction relative to a center of the RFIC element to suck the RFIC element towards the antenna patterns.

6. The apparatus according to claim 5,
- wherein the plurality of antenna patterns of the antenna base material includes a plurality of rows of antenna patterns extending in the first direction and parallel to each other, and
- wherein the plurality of uniaxial plotters are each configured to position a respective RFIC element to a predetermined position on a respective row of the plurality of antenna patterns, such that each respective RFIC element is temporarily bonded to the respective row.

7. A method for manufacturing an RFID tag, the method comprising:
- conveying an antenna base material that includes a plurality of antenna patterns in a first direction;
- supplying at least one RFIC element having terminal electrodes for connection with the antenna patterns on one principal surface thereof;
- positioning, by a plotter having movable suction head, the supplied RFIC element to a predetermined position of the antenna patterns, such that the RFIC element is temporarily bonded to the predetermined position of the antenna patterns by conveying the RFIC element in a second direction crossing the first direction by a plurality of uniaxial plotters spaced apart from each other in the first direction; and
- permanently bonding, by a pressurizer, the temporarily bonded RFIC element to the antenna patterns.

8. The method for manufacturing an RFID tag according to claim 7, wherein the temporarily bonding of the RFIC element to the predetermined position of the antenna patterns comprises sucking, by the movable suction head of the plotter, the RFIC element in a releasable manner.

9. The method for manufacturing an RFID tag according to claim 8, wherein the temporarily bonding of the RFIC element to the predetermined position of the antenna patterns comprises sucking, by the movable suction head of the plotter, the RFIC element on an advancing side in the first direction relative to the center of the RFIC element.

10. The method for manufacturing an RFID tag according to claim 7, wherein the antenna base material is a base film having the plurality of antenna patterns.

11. The method for manufacturing an RFID tag according to claim 10, further comprising continuously supplying the base film from a base film roll while the base film having the RFIC element permanently bonded thereon is collected in a roll shape.

12. The method for manufacturing an RFID tag according to claim 7, wherein the antenna base material is paper.

13. The method for manufacturing an RFID tag according to claim 12, wherein the paper has a prescribed display preliminarily printed thereon.

14. The method for manufacturing an RFID tag according to claim 7, further comprising:
- sucking, by the movable suction head of the plotter, the RFIC element towards the antenna patterns to be temporarily bonded thereto; and
- releasing, by the movable suction head of the plotter, the RFIC element before permanently bonding, by the pressurizer, the RFIC element to the antenna patterns.

15. The method for manufacturing an RFID tag according to claim 14, wherein the first direction is an X axis direction, and the method further comprising moving the movable suction head in Y axis and Z axis directions that are orthogonal to the X axis direction, respectively, such that the movable suction head is rotatable in the Z axis direction.

* * * * *